United States Patent [19]

LaBarre

[11] 4,118,307
[45] Oct. 3, 1978

[54] BATCH SODIUM HYPOCHLORITE GENERATOR

[75] Inventor: Ronald L. LaBarre, Euclid, Ohio
[73] Assignee: Diamond Shamrock Corporation, Cleveland, Ohio
[21] Appl. No.: 768,538
[22] Filed: Feb. 14, 1977
[51] Int. Cl.$^2$ .......................... C25B 1/34; C25B 11/10
[52] U.S. Cl. ...................................... 204/268; 204/95; 204/149; 204/290 F
[58] Field of Search .................... 204/149, 268, 290 F, 204/95

[56] References Cited

U.S. PATENT DOCUMENTS

| | | | |
|---|---|---|---|
| 2,701,790 | 2/1955 | Goument | 204/230 |
| 3,274,094 | 9/1966 | Klein | 204/149 |
| 3,849,281 | 11/1974 | Bennett | 204/268 |
| 3,917,518 | 11/1975 | Franks et al. | 204/290 F |

*Primary Examiner*—T. Jung
*Attorney, Agent, or Firm*—John P. Hazzard

[57] ABSTRACT

A batch type sodium hypochlorite generator and temporary storage unit comprising a sheet anode and a sheet cathode utilizing vertical S-shaped bipolar sheet electrodes in series therebetween, the cathode and cathodic end of each bipolar unit being substantially encircled by the anode or anodic end of the next adjacent bipolar unit and forming an electrolytic cell therebetween; said anode portion of each electrode having the surface thereof coated with a dimensionally stable electrode coating which is extremely resistant to passivation; nonconductive spacers between each such electrolytic cell to both hold the electrodes in proper alignment and to minimize stray currents between the electrolytic cells; and control means for feeding brine to such generator and discharging such sodium hypochlorite solution therefrom when required.

12 Claims, 2 Drawing Figures

BATCH SODIUM HYPOCHLORITE GENERATOR

BACKGROUND OF THE INVENTION

Numerous sodium hypochlorite generators are known in the prior art. These are used for the production of sodium hypochlorite for use in waste water treatment, swimming pool applications, laundry applications, and various other instances where bacteria is controlled by the use of the hypochlorite. The sodium hypochlorite generators of the prior art all are what might be termed pass through generator systems. By this is meant when the sodium hypochlorite is generated in such a generator it is immediately discharged from the generator to its particular application or to a separate storage area for later use. The sodium hypochlorite generators of the prior art were not functional for both the storage of the sodium hypochlorite solution and long anode life since the anode would quickly passivate or the hypochlorite would rapidly decompose in the presence of the inactive electrodes. Typical of such hypochlorite generators of the prior art are U.S. Pat. No. 2,701,790; U.S. Pat. No. 3,210,262; and U.S. Pat. No. 3,222,269.

STATEMENT OF THE INVENTION

The batch type sodium hypochlorite generator of the instant invention serves also as its own storage chamber. This is possible due to the specific structure involved as well as the materials of construction. Thus, the appartus of the instant invention has the advantage over the once through type of generator known in the prior art in that the hypochlorite is instantly available for use in applicant's apparatus whereas there is of necessity a time delay in producing the required hypochlorite in the once through apparatus of the prior art. Likewise, the prior art unit which utilizes an associated storage chamber cannot be as compact or efficient a unit as that of the instant invention.

Basically, the hypochlorite generator of the instant invention consists of a plurality of individual electrolytic cells. Each such monopolar cell consists of a vertically disposed sheet cathode sandwiched between vertically disposed sheet anodes of substantially the same size and shape. The surfaces of the anodes facing the cathode in each such cell having an electrically conductive, electro-catalytically active coating which is resistant to passivation in a hypochlorite environment. Preferably, the anode is a single sheet which has been folded back on itself to essentially completely surround the cathode. A preferred electro-conductive, electro-catalytically active coating for the anodes of the instant invention consists essentially of from 1.0 to 10.0 percent antimony oxide, from 30 to 90 percent tin dioxide, from 1.0 to 50 percent of at least one platinum group metal oxide, and from 0.5 to 30 percent of a valve metal oxide selected from the group consisting of titanium and tantalum oxides, with the proviso that the mole ratio of tin to antimony oxides is between 95 to 5 and 85 to 15. Other dimensionally stable anodes such as Beer anodes as described in U.S. Pat. Nos. 3,236,756; 3,632,498; 3,751,296; 3,933,616, as well as those described in U.S. Pat. No. 3,878,083 could likewise be used in the present invention since they likewise resist passivation and have long life times in the cell environment, but cause relatively rapid decomposition of hypochlorite when electrolytically inactive.

Suitable substrates for such sheet electrodes include generally any metal of sufficient electrical conductivity and mechanical and chemical resistance to the cell environment. For example, these materials may include nickel, steel, stainless steel, titanium niobium, zirconium, and tantalum. Especially preferred for most applications are titanium, niobium, or tantalum substrates. Of course, those substrates bearing an exterior coating such as copper or aluminum-cored titanium or a platinum or other conductive metal layer over a titanium substrate, are contemplated. Generally, prior to deposition of the coating and in order to provide a base to which the coating may be satisfactorily anchored, an etching or other cleaning operation is employed. The tin dioxide utilized in the coating composition is preferably present in the form of crystalline $SnO_2$ and employed within the range of from 30 to 90 percent by weight of the total coating composition on an oxide basis, especially 60 to 90 percent $SnO_2$.

The antimony oxide component apparently enters into the tin oxide crystal lattice, rendering the same more electrically conductive. Although the antimony is present in an indeterminate oxide form owing to its entrance into the tin oxide crystal lattice, it may be expressed for convenience sake as $Sb_2O_3$. Thus, on this basis the antimony oxide is present within the range of 1.0 to 10, preferably 4.0 to 10 percent by weight. The ratio of tin oxide to antimony oxide is preferably 90 to 10.

The third component of the coating is at least one "platinum group metal oxide," by which term it is intended to include the oxides of platinum, palladium, ruthenium, iridium, rhodium, and osmium, preferably ruthenium, iridium, rhodium, and palladium, and especially mixtures of ruthenium with iridium, rhodium, or palladium oxides. These platinum group metal oxides are present in their most highly oxidized form and within the range of from 1.0 to 50 percent by weight, preferably between 1.0 and 25 percent by weight. The final component is a valve metal oxide selected from the group consisting of titanium and tantalum oxides. While the titanium is present in the form of $TiO_2$ and is generally crystalline (rutile) in nature, when tantalum is employed, an essentially amorphous tantalum oxide results. Therefore, although it is expressed as $Ta_2O_5$ it is understood that mixtures of tantalum oxides may in fact be present. The amounts of valve metal oxides employed are generally within the range of from 0.5 to 30 percent by weight and especially 0.5 to 3.0 percent by weight. Titanium is the preferred valve metal although tantalum can also be used.

Such a plurality of individual electrolytic cells having the anode surfaces coated as described are arranged in a nonconductive container, said container being equipped with an inlet so as to charge brine to said container and an outlet to conduct the hypochlorite solution so formed out of the cell. In addition, such container has a vent to vent hydrogen formed during the electrolysis as well as control means to effect the brine charging and hypochlorite solution discharge in timed relationship.

BRIEF DESCRIPTION OF DRAWINGS

The preferred apparatus of this invention may be understood by reference to the accompanying figures.

DETAILED DESCRIPTION OF THE PREFERRED FORM OF THE PRESENT INVENTION

Figure 1:
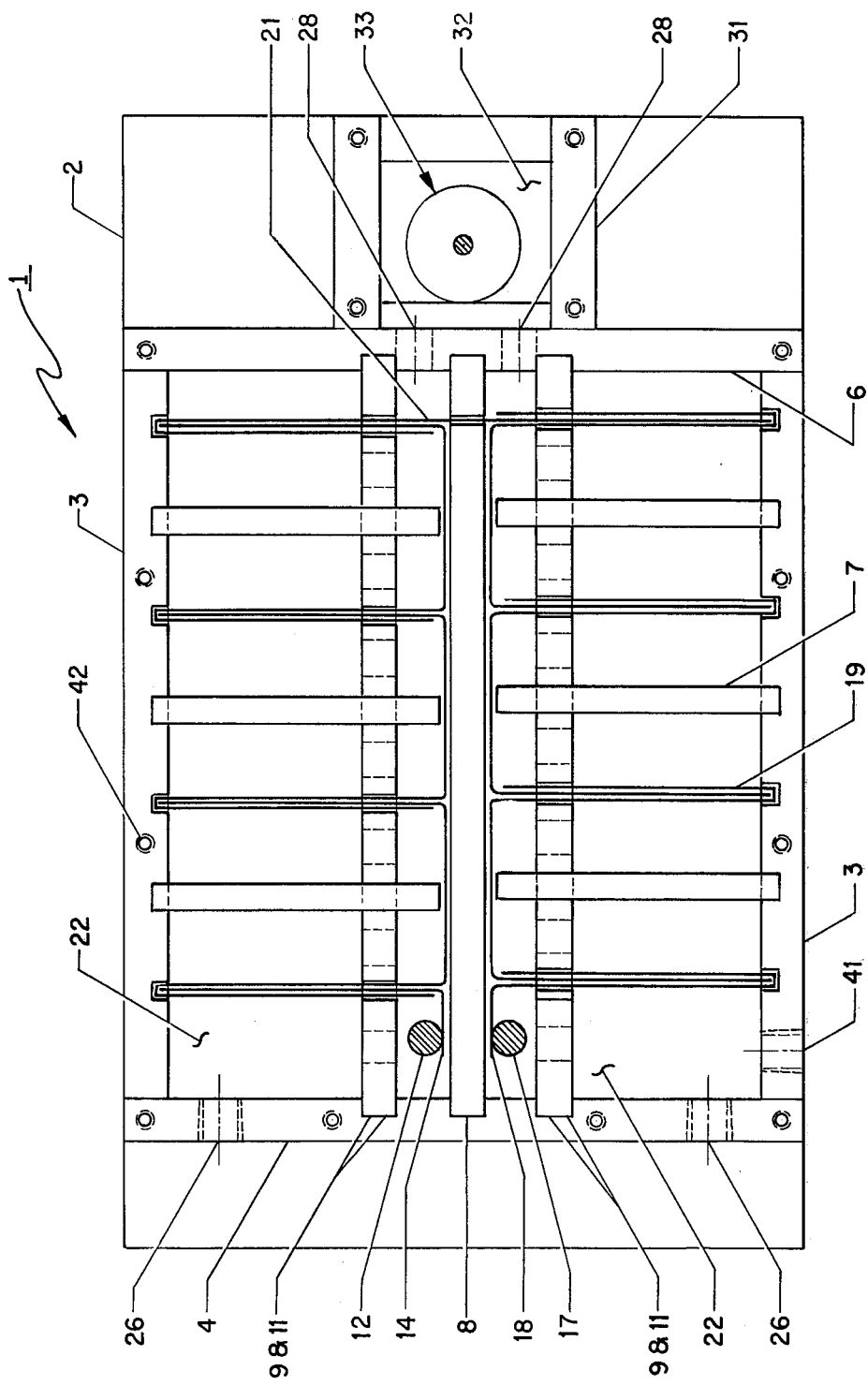
FIG. 1 shows a vertical view of the preferred batch sodium hypochlorite generator and storage unit of the instant invention with the top cover removed.
Figure 2:
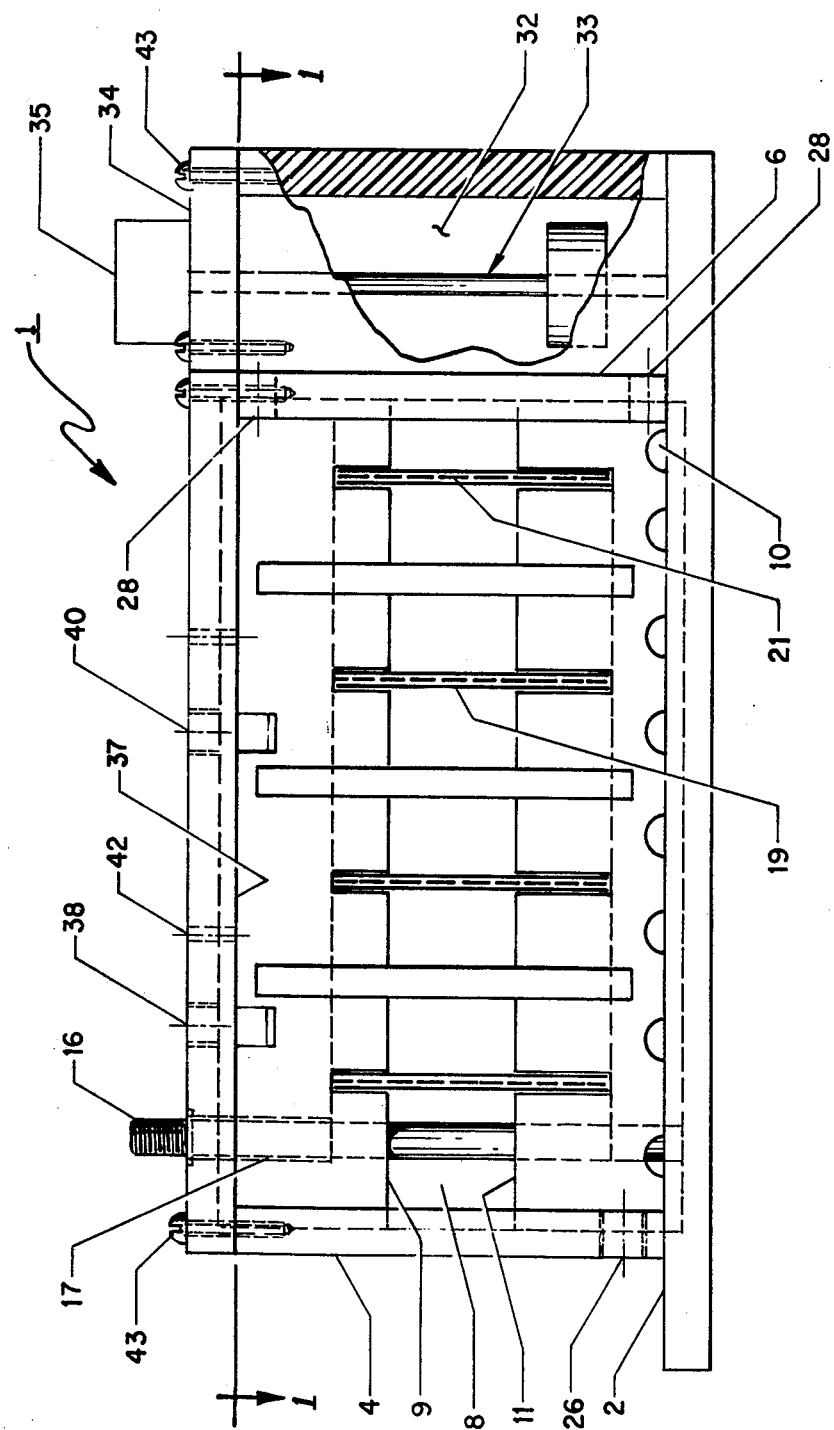
FIG. 2 shows a side view of the preferred batch sodium hypochlorite generator and storage unit sectioned through the electrodes.

A typical sodium hypochlorite production cell and storage unit 1 is shown in FIGS. 1 and 2. Such cell and storage unit consists of a plurality of individual electrolytic cells contained within a leak proof container made up of cell baseplate 2, cell sidewalls 3, and endwalls 4 and 6. The container is also covered with a cell top plate 37 which is removeably attached to the remainder of the container through assembly bolts 43 when inserted into matching apertures 42 which extend through the cell top plate 37 into the cell sidewalls and endwalls. The body of the container can be made of any material which is nonconductive and can withstand the environment in which it is placed. Typically, a wide variety of plastics can be used to form the baseplate, sidewalls, endwalls, and cover for the container. Preferably, they would be made from polyvinyl chloride or polypropylene.

Cell and storage unit 1 is also provided with a brine feed inlet, 38 a hydrogen vent to atmosphere 40 and hypochlorite discharge outlets 26 as well as emergency drain outlet 41.

Within the confines of the hypochlorite cell and storage unit 1 are the electrolytic cells which convert the brine solution into a sodium hypochlorite solution. The specific cell arrangement is not critical. For example, a plurality of cells consisting entirely of monopolar electrodes can be utilized having appropriate electrical connections to each. However, bipolar electrodes, such as shown in FIGS. 1 and 2, offer significant economies of construction and operation and are the preferred electrode configuration in the instant apparatus.

As shown in FIGS. 1 and 2, electrical connections to the cells protrude through the top cover plate of the cell in the form of anode connection rod 17 and cathode connection rod 12. These connection rods are attached to but insulated from the cover plate in any manner familiar to those skilled in the art. The upper end of these connection rods are threaded or the like, such as shown at 16, so that the electrical connections can be conveniently made. Connected to anode connection rod 17 is a monopolar anode plate 18 which is attached by welding or the like. Similarly, cathode connection rod 12 has attached thereto, preferably by welding, a monopolar cathode plate 14. Between anode plate 18 and cathode plate 14 are placed a plurality of bipolar electrodes which in effect form multiple cells from the single anode and cathode inputs. The anode plate, cathode plate and interconnecting bipolar electrodes are all made from sheet material and are arranged vertically so that the sheet electrodes parallel the endwalls of the hypochlorite cell and storage unit over substantial portion of their height. Although said electrodes are spaced from the top cover plate and base plate.

The intermediate bipolar electrodes are preferably S-shaped as illustrated by FIG. 1. As can be seen from FIG. 1, these S-shaped electrodes resemble a block "S" with one loop of the "S" being rather closed to form the anodic portion of the electrode. The more open loop of the "S" provides the interconnection to the next cell and allows spacers such as 7 to be used to substantially segregate the cells to minimize stray current. Thus, the bipolar S-shaped electrode preferred in the instant apparatus consists of a two part anodic portion encircling a single cathodic sheet of another electrode which is either the cathode plate or the cathodic portion of another bipolar electrode and a single cathodic sheet which acts as the cathode of the next cell in conjunction with either a two sheet anode of another bipolar cell or the anode plate.

As mentioned previously, it is preferred that the anode plate, cathode plate and intermediate bipolar electrodes be made from sheet material. The sheet may be any of the metals generally used in electrodes. However, it is preferred that titanium sheet be used. The electrode sheet material used for the anode plate, cathode plate and the intermediate bipolar electrodes can be readily shaped by bending so as to form anode and cathode sheets that are parallel to one another in each cell and having anodes that surround a single cathode sheet. The portion of the anode which surrounds a cathode sheet and the surface facing said cathode sheet are coated with an electrically conductive, electrocatalytic coating so as to prevent anodic passivation. Typically, such coatings can be those as described in U.S. Pat. Nos. 3,776,834, 3,875,043, or 3,878,083. Preferably, however, the electrical conductive, electrocatalytic coating is one that contains a mixed oxide coating of from 30 to 90 percent stannic oxide, 1.0 to 10 percent antimony oxide ($Sb_2O_3$), 1.0 to 50 percent of at least one platinum group metal oxide, and from 0.5 to 30 percent of a valve metal oxide selected from the group consisting of titanium and tantalum oxides, with the proviso that the mole ratio of tin to antimony oxides is between 95:5 and 85:15. Such coating can be applied to the flat electrode sheet from which the shaped electrode is to be formed in any conventional manner and need only be applied to the surface of the anodic portion of the electrode which faces the corresponding cathode which makes up the individual cell. Typically, however, the mixed metal oxide coating can be applied to the electrode in a manner as disclosed in U.S. Pat. No. 3,875,043.

In bending the sheet anode material to the desired shape, it must be borne in mind that the gap between anode and cathode should be as low as possible. Thus, the bends in the sheet material must be extremely accurate and made with close tolerances as it is preferred to keep the gap therebetween as low as possible. Such gaps can be any dimension desired, however, the smaller the gap the less resistance and thus greater efficiency in the unit. While most gaps are maintained within 10 millimeters, it is preferred to keep the gap between ½ and 3 millimeters. The lower gap limit is basically limited merely by the physical difficulty in placing the electrodes close together without touching in commercial units. Normally small nonconductive spacers are utilized to prevent shorting while maintaining small electrode gaps.

As seen in FIG. 1, the primary anode and cathode are located at one end of the cell and a crossover electrode 21 is utilized to direct the cells in series back to the primary electrical connections. This is a preferred configuration when space is of the utmost importance. Although obviously a straight inline configuragion with the anode at one end and the cathode at the other end of the cell would result in a cell of the same total volume the extreme length of such a cell may cause difficulty in placement in some applications.

With the requirement of minimal gap between the anode and the cathode in each cell, care must be taken to see that the anodes are indeed flat and parallel to one another and are held in proper position so that they do not effect a short. To hold the electrodes in proper spacial relationship, upper and lower support spacers 9 and 11 are utilized along with nonconductive spacers between active areas of the electrodes. These support spacers can be made of any nonconductive material that can withstand the brine and hypochlorite environment. Typically, these support spacers extend the length of the cell and are slideably mounted in grooves in endwalls 4 and 6. The spacer bars are grooved along their length to accommodate the electrode shape so as to hold it in place. More than one such set of spacer bars can be used on each series of hypochlorite cells. However, it is preferred that a single set of upper and lower spacers be used to hold the electrodes in proper spacial relationship on the side opposite the sidewalls. The portion of the electrodes adjacent the sidewall can be held in place by grooving the sidewalls to accommodate the electrodes and hold the same in place. Apertures 10 in the lower spacers allow the free flow of electrolyte within electrolyte chamber 22 between the cells. Similar apertures extend through the upper or top support spacers 9 so as to allow any hydrogen evolved during electrolysis to communicate with vent 40.

Additional spacers can also be utilized to help hold the electrodes in proper position and/or to act as walls to prevent stray currents from going between adjacent cells. For example, center spacer 8 and the side spacers 7 separate the cells on each side of the hypochlorite cell and storage unit and the individual cells on one side thereof respectively. Such spacers generally extend below the anode and cathodes as well as above same but are spaced from the baseplate and cover of the unit so as to allow free electrolyte communication between cells.

Associated with the hypochlorite cell and storage unit of the instant invention are control means wherein the hypochlorite solution within the cell is discharged through discharge outlets 26 on command. Upon completion of the discharge of the hypochlorite solution, the discharge outlets are automatically closed by controls known in the art and a new charge of brine is fed into the cell. Numerous control mechanisms can be utilized and in fact some can be utilized within the electrolyte chamber 22. However, for the purposes of illustration, FIGS. 1 and 2 show a float chamber 32 associated with the hypochlorite cell and storage unit 1. The float chamber is contained within float box 31 and the float chamber 32 is in communication with electrolyte chamber 22 through apertures 28 in cell endwall 6. Preferably, apertures 28 are offset from one another with one being at the lower end of cell endwall 6 adjacent cell baseplate 2 while the other aperture is located near the top of cell endwall 6 adjacent the cell cover. This offset relationship of the apertures effectively prevents stray currents communicating through the float chamber to the next cell. Within float chamber 32 is a float unit 33 which senses the liquid level within the cell. Associated therewith is control 35 which upon emptying of the cell closes the discharge outlets 26 from the cell and opens the inlet to allow a new brine charge to enter. Likewise, the electrolysis is then actuated in time sequence to convert the brine solution to hypochlorite solution of the desired strength at which time the electrolysis is stopped and the hypochlorite so produced is held till needed.

Hypochlorite cell and storage units of the instant invention can be utilized in a wide variety of ways. Typically, such can be used for disinfecting swimming pools, waste water treatment, and human waste disinfection units such as are used on trains, airplanes, and in recreation vehicles whether for use on land or sea. Particularly, in these last mentioned uses, a need exists for a most compact unit and in fact that is what the instant apparatus was designed to accomplish.

In operation of a unit such as described in FIGS. 1 and 2 with respect to a waste treatment system, the user of the waste treatment system trips a switch which activates control 35. Control 35 thereupon causes hypochlorite discharge outlets 26 to be opened so that the hypochlorite solution within the hypochlorite cell and storage unit 1 is discharged for use in killing any bacteria in another vessel. Upon dischage of a preselected quantity of the hypochlorite solution, control 35 closes the hypochlorite discharge outlets 26 and activates a brine supply system which supplies a predetermined amount of brine to the electrolytic cell through feed inlet 38. The control for determining the amount of material discharged through outlets 26 can be regulated by a float unit such as illustrated or any other equivalent control mechanism. The salt concentration of the brine charged to the unit is optimumly approximately 30 grams per liter sodium chloride. Although the salt concentration can vary between 10 and 50 grams per liter. The required salt concentration may vary between different units depending on electrolysis time available between discharges and the volume of the hypochlorite cell and storage unit, but will usually be within this range and preferably around 30 grams per liter. The brine in the cell is sufficient to cover the electrodes during operation which improves the convection or mixing of the electrolyte and increases the current efficiency of the cell.

When electrolyzing the brine solution within the hypochlorite cell and storage unit of the present invention, a current density of between 0.5 and 2.0 amperes per square inch is used. Higher current densities within this range result in higher current efficiencies and the increased gas evolution at the higher current densities increases the mixing in the cell thereby reducing the inefficiency due to depletion of sodium chloride in the vicinity of the electrodes. This mixing also reduces the hypochlorite concentration and heat generated at the electrode surface further helping to optimize efficiency. The optimum current density is about 1.25 amperes per square inch. Although a preferred range would be between 1.0 and 1.5 amperes per square inch would appear suitable. Additionally, the higher current densities in conjunction with the sheet electrodes combine to make the most practical combination to prevent hardness buildup on the electrodes. The bubbles formed in the confined space between the anode and cathode as illustrated in the drawings continually scrub the active surface of the electrodes, to prevent buildup of calcium and/or magnesium deposits which greatly lengthens the life of the unit. Also, this sandwich electrode arrangement wherein the cathode sheet is substantially surrounded by the anode sheets also minimizes warpage of the cathode. During standard electrolysis of a titanium cathode, a hydride layer builds up on the active surface of the cathode which induces stress within the cathode which ultimately results in a bending moment causing distortion of the cathode. Bending would result to a titanium cathode if the same completely surrounded an anode. However, in the present arrangement as shown in the drawings, an anode completely surrounds the cathode and such a titanium cathode would have a hydride layer built up on both sides which would tend to uniformly distribute such stresses to both surfaces of the anode thus counterbalancing each other.

EXAMPLE

A hypochlorite cell and storage unit such as depicted in FIGS. 1 and 2 was prepared to approximately the scale shown in the drawings. The overall size of the unit was approximately 16 inches long by 10 inches wide by 7 inches high. Each electrode within the unit was suspended approximately ¾ inch off the bottom of the cell and was covered by 1 inch of brine during operation. Spacers between each cell extended upward to the water line and downward to within ¼ inch of the bottom of the cell. The unit was operated flooded to eliminate hydrogen buildup. The unit as described was operated under the following conditions: 1) a 2.0 millimeter gap between anodes and cathodes; 2) an initial solution temperature between 10 and 30° C.; 3) a salt concentration of approximately 30 grams per liter; and 4) a current density of 1.25 ASI at 3.6 volts per gap.

Such operation of the cell resulted in the production of 6.0 liters of 7.0 gram per liter sodium hypochlorite in each 2 minute operating cycle. Comparative testing of storage time and/or decomposition rates of the sodium hypochlorite show that the preferred electro-catalytic coatings of the instant invention far surpassed those others disclosed in the instant application.

The electrodes used in the example were sheet titanium having a metal oxide coating on the anodic portions thereof consisting of 2% $TiO_2$, 4% $RuO_2$, 85% $SnO_2$ and 9% $Sb_2O_3$. The coating was applied to the anodic portions, after first dissolving the proportionate quantities of $SnCl_4 \cdot 5H_2O$, $SbCl_3$, $RuCl_3 \cdot xH_2O$ (38% Ru) and orthobutyl titanate in butanol, by painting the anodic portion with such solution, followed by drying at 110° C. for 3 minutes and baking in air at 500° C. for 7 minutes. The coating, drying and baking procedure was repeated 5 times.

Storage of such hypochlorite solution in such a cell resulted in less than 8% decomposition of the hypochlorite after 40 hours. Similar storage tests on comparable cells using electrodes having their anodic portion coated with compositions such as disclosed in U.S. Pat. No. 3,776,834 resulted in approximately 95% decomposition over 40 hours.

I claim:

1. A sodium hypochlorite generator-storage unit comprising:
   an enclosed substantially rectangular cell made up of a cell baseplate, cell endwalls, cell sidewalls and a removable cell top plate;
   means for charging said cell with brine;
   means for electrolyzing said charged brine in said cell so as to form a sodium hypochlorite solution; said electrolyzing means comprising substantially rectangular vertically-arranged plate like electrodes consisting of at least one anode and one cathode, said anode being approximately twice the size of said cathode and being U-shaped so as to be parallel to and essentially enclose the related cathode, said cathode having a valve metal surface and the inner surface of said U-shaped anode having thereon an electroconductive, catalytically active dimensionally stable coating thereon;
   means to vent the hydrogen formed during the electrolysis from said cell;
   means to discharge the sodium hypochlorite solution formed by electrolysis in said cell when desired; and control means which, when activated, effects the discharge of a precise amount of sodium hypochlorite solution, discontinues such a discharge, refills said cell with brine, electrolyzes the brine to obtain the desired hypochlorite concentration, and then awaits reactivation.

2. The sodium hypochlorite generator-storage unit of claim 1 wherein the electroconductive, catalytically active dimensionally stable coating consists essentially of from 1.0 to 10% by weight $Sb_2O_3$, 30–90% by weight $SnO_2$, from 1.0 to 50% of at least one platinum group metal oxide and from 0.5 to 30% of a valve metal oxide selected from the group consisting of titanium and tantalum oxides, with the proviso that the mole ratio of $SnO_2:Sb_2O_3$ is between 95:5 and 85:15.

3. The sodium hypochlorite generator-storage unit of claim 2 wherein the active portions of the electrodes have a gap of from 0.5 to 10.0 mm and are held in such operable spacial relationship by spacers made of nonconductive material which contact the electrodes at multiple points.

4. The sodium hypochlorite generator-storage unit of claim 1 wherein the valve metal surface is a titanium surface and the electro-conductive, catalytically active dimensionally stable coating consists essentially of from 4.0 to 10% by weight $Sb_2O_3$, 60–90% by weight $SnO_2$, from 1.0 to 25% of at least one platinum group metal oxide and from 0.5 to 3% of a valve metal oxide selected from the group consisting of titanium and tantalum oxides, with the proviso that the mole ratio of $SnO_2:Sb_2O_3$ is between 95:5 and 85:15.

5. A sodium hypochlorite generator-storage unit comprising:
   an enclosed substantially rectangular cell made up of a cell baseplate, cell endwalls, cell sidewalls and a removable cell top plate;
   means for charging said cell with brine;
   means for electrolyzing said charged brine in said cell so as to form sodium hypochlorite solution, said electrolyzing means comprising a plurality of electrolytic cells made up of an anode, a cathode and at least one bipolar electrode therebetween, the electrolytically active portions of said anode, cathode and at least one said bipolar electrode being generally vertically arranged, rectangular sheet-like metallic conductors having active anode and cathode surfaces of approximately equal area, and further characterized in that the cathode comprises a single conductive sheet electrolytically active on both sides thereof, said anode being approximately twice the size of said cathode or cathode portion of the bipolar electrodes and being U-shaped with only the inner face being electrolytically active and arranged so as to be parallel to and essentially enclose the cathode portion of said related bipolar electrode, and said bipolar electrodes being essentially S-shaped wherein one loop of the "S" corresponds to the anode portion thereof and is approximately the size and shape of said anode and is arranged parallel to and essentially encloses a related cathode or cathodic portion of another bipolar electrode while the remaining portion of the S-shaped electrode which parallels the major portion of anode area is the cathodic portion of said bipolar electrode and approximates the size and shape of the cathode, said cathode and said cathode portion of said bipolar electrodes having a valve metal surface while said anode and said inner surface of said anode portion of said bipolar electrodes have an electroconductive, catalytically active dimensionally stable coating thereon;

means to vent the hydrogen formed during the electrolysis from said cell;

means to discharge the sodium hypochlorite solution formed by electrolysis in said cell when desired; and control means which, when activated, effects the discharge of a precise amount of sodium hypochlorite solution, discontinues such discharge, refills said cell with brine, electrolyzes the brine to obtain the desired hypochlorite concentration, and then awaits reactivation.

6. The sodium hypochlorite generator-storage unit of claim 5 wherein the electro-conductive, catalytically active dimensionally stable coating consists essentially of from 1.0 to 10% by weight $Sb_2O_3$, 30–90% by weight $SnO_2$, from 1.0 to 50% of at least one platinum group metal oxide and from 0.5 to 30% of a valve metal oxide selected from the group consisting of titanium and tantalum oxides, with the proviso that the mole ratio of $SnO_2:Sb_2O_3$ is between 95:5 and 85:15.

7. The sodium hypochlorite generator-storage unit of claim 6 wherein the active portions of the electrodes have a gap of from 0.5 to 10.0 mm. and are held in such operable spacial relationship by spacers made of nonconductive material which contact the electrodes at multiple points.

8. The sodium hypochlorite generator-storage unit of claim 5 wherein the valve metal surface is a titanium surface and the electro-conductive, catalytically active dimensionally stable coating consists essentially of from 4.0 to 10% by weight $Sb_2O_3$, 60–90% by weight $SnO_2$, from 1.0 to 25% of at least one platinum group metal oxide and from 0.5 to 3% of a valve metal oxide selected from the group consisting of titanium and tantalum oxides, with the proviso that the mole ratio of $SnO_2:Sb_2O_3$ is between 95:5 and 85:15.

9. A compact sodium hypochlorite generator-storage unit comprising:

an enclosed substantially rectangular cell made up of a cell baseplate, cell endwalls, cell sidewalls and a removable cell top plate;

means for charging said cell with brine;

means for electrolyzing said charged brine in said cell so as to form sodium hypochlorite solution, said electrolyzing means comprising a plurality of electrolytic cells arranged in two adjacent parallel rows within the rectangular cell separated by a central spacer member which prevents stray current to pass between the electrolytic cells of the adjacent rows, said plurality of electrolytic cells consist of an anode and cathode located at one end of the rectangular cell and in separate adjacent parallel rows and being electrolytically interconnected by a plurality of S-shaped bipolar electrodes and a bipolar crossover electrode, the electrolytically active portions of said anode, cathode, and S-shaped bipolar electrodes, and bipolar crossover electrode being generally vertically arranged, rectangular sheet-like metallic conductors having active anode and cathode surfaces of approximately equal area, and further characterized in that the cathode and the cathodic portions of the S-shaped bipolar electrodes are electrolytically active on both sides thereof, said anode being approximately twice the size of said cathode or cathode portion of the bipolar electrodes and being U-shaped with only the inner face being electrolytically active and arranged so as to be parallel to and essentially enclose the cathode portion of said related bipolar electrode, said S-shaped bipolar electrodes having one loop of the "S" corresponds to the anode portion thereof and is approximately the size and shape of said anode and is arranged parallel to and essentially encloses a related cathode or cathodic portion of another bipolar electrode while the remaining portion of the S-shaped electrode which parallels the major portion of anode area is the cathodic portion of said bipolar electrode and approximates the size and shape of the cathode, said bipolar crossover electrode being the only electrolytic connection between the adjacent rows and having an anodic portion corresponding in size and shape to the anodic portion of the anode or S-shaped electrodes in one said row with a cathodic portion corresponding in size and shape to the cathodic portion of the cathode or S-shaped electrodes in the other row, said cathode and said cathode portion of said bipolar electrodes having a valve metal surface while said anode and said inner surface of said anode portion of said bipolar electrodes have an electroconductive, catalytically active dimensionally stable coating thereon;

means to vent the hydrogen formed during the electrolysis from said cells;

means to discharge the sodium hypochlorite solution formed by electrolysis in said cell when desired; and control means which, when activated, effects the discharge of a precise amount of sodium hypochlorite solution, discontinues such discharge, refills said cell with brine, electrolyzes the brine to obtain the desired hypochlorite concentration, and then awaits reactivation.

10. The sodium hypochlorite generator-storage unit of claim 9 wherein the electro-conductive, catalytically active dimensionally stable coating consists essentially of from 1.0 to 10% by weight $Sb_2O_3$, 30–90% by weight $SnO_2$, from 1.0 to 50% of at least one platinum group metal oxide and from 0.5 to 30% of a valve metal oxide selected from the group consisting of titanium and tantalum oxides, with the proviso that the mole ratio of $SnO_2:Sb_2O_3$ is between 95:5 and 85:15.

11. The sodium hypochlorite generator-storage unit of claim 10 wherein the active portions of the electrodes have a gap of from 0.5 to 10.0 mm. and are held in such operable spacial relationship by spacers made of nonconductive material which contact the electrodes at multiple points.

12. The sodium hypochlorite generator-storge unit of claim 9 wherein the valve metal surface is a titanium surface and the electro-conductive, catalytically active dimensionally stable coating consists essentially of from 4.0 to 10% by weight $Sb_2O_3$, 60–90% by weight $SnO_2$, from 1.0 to 25% of at least one platinum group metal oxide and from 0.5 to 3% of a valve metal oxide selected from the group consisting of titanium and tantalum oxides, with the proviso that the mole ratio of $SnO_2:Sb_2O_3$ is between 95:5 and 85:15.

* * * * *